US009229728B2

(12) United States Patent
Chung

(10) Patent No.: US 9,229,728 B2
(45) Date of Patent: Jan. 5, 2016

(54) PROCESSING SYSTEM OF ELECTRONIC DEVICE AND OPERATING METHOD THEREOF WITH CONNECTED COMPUTER DEVICE

(71) Applicant: LITE-ON TECHNOLOGY CORPORATION, Taipei (TW)

(72) Inventor: Chien-Ping Chung, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 1 day.

(21) Appl. No.: 14/251,162

(22) Filed: Apr. 11, 2014

(65) Prior Publication Data

US 2015/0186149 A1   Jul. 2, 2015

(30) Foreign Application Priority Data

Jan. 2, 2014   (CN) .......................... 2014 1 0001330

(51) Int. Cl.
G06F 3/00 (2006.01)
G06F 15/76 (2006.01)
G06F 9/44 (2006.01)
G06F 3/06 (2006.01)

(52) U.S. Cl.
CPC ................ *G06F 9/4401* (2013.01); *G06F 3/06* (2013.01)

(58) Field of Classification Search
CPC .............................. G06F 9/3877; G06F 9/3004
See application file for complete search history.

(56) References Cited

U.S. PATENT DOCUMENTS

| 6,430,674 | B1 * | 8/2002 | Trivedi et al. ................... 712/43 |
| 7,017,030 | B2 * | 3/2006 | Oldfield et al. ............... 712/207 |
| 7,437,535 | B1 * | 10/2008 | Joffe et al. ...................... 712/34 |
| 7,769,983 | B2 * | 8/2010 | Smith et al. .................... 712/213 |
| 8,756,405 | B2 * | 6/2014 | Moyer ........................... 712/225 |
| 8,977,822 | B2 * | 3/2015 | Resnick ......................... 711/154 |
| 9,021,176 | B2 * | 4/2015 | Resnick ............................ 711/5 |
| 9,032,145 | B2 * | 5/2015 | Resnick ......................... 711/112 |
| 2007/0150671 | A1 * | 6/2007 | Kurland ......................... 711/154 |
| 2008/0052492 | A1 * | 2/2008 | Stuttard et al. .................. 712/22 |
| 2011/0172740 | A1 * | 7/2011 | Matos ............................. 607/60 |
| 2014/0173203 | A1 * | 6/2014 | Forsyth ......................... 711/120 |

\* cited by examiner

*Primary Examiner* — Henry Tsai
*Assistant Examiner* — Jing-Yih Shyu
(74) *Attorney, Agent, or Firm* — Rabin & Berdo, P.C.

(57) ABSTRACT

A processing system capable of connecting to a computer device comprising a second processing unit is provided. The processing system comprises a first processing unit and a first storage unit. The first storage unit is coupled to the first processing unit for storing at least a first programming code and a second programming code. At a first time point, the first processing unit accesses the first programming code from the first storage unit to set the processing system. At a second time point after the first time point, the first processing unit receives an instruction from the second processing unit and transfers the second programming code to the second processing unit in response to the instruction. The second processing unit controls the processing system with the second programming code.

8 Claims, 4 Drawing Sheets

PROCESSING SYSTEM OF ELECTRONIC DEVICE AND OPERATING METHOD THEREOF WITH CONNECTED COMPUTER DEVICE

This application claims the benefit of People's Republic of China Application Serial No. 201410001330.2, filed Jan. 2, 2014, the subject matter of which is incorporated herein by reference.

BACKGROUND OF THE INVENTION

1. Field of the Invention

The invention relates in general to a processing system and an operating method thereof, and more particularly to a processing system capable of reducing the number of storage units and an operating method thereof.

2. Description of the Related Art

Multiplex technology has been widely used in the processing system of electronic device. Particularly, in an electronic device capable of connecting to a computer device, the processing system must be capable of processing the operation of the electronic device itself and the operation between the electronic device and the computer device. In general, the electronic device itself has an independent processor, and the computer device has another independent processor.

Conventionally, the processing system of an electronic device operates multiplex processors independently, and normally has corresponding memories for the processors to store necessary programming codes. Suppose the storage device is a hard disc, a solid state disc, or an optical disc drive of an electronic device. The storage device comprises two memories: one stores the data of the storage device and accesses a programming code required for the operation of the system, and the other stores a programming code required for communicating with the computer device. However, as the variety of processors is getting more and more diversified, the number of corresponding memories increases, hence increasing the manufacturing cost and design difficulty of the processing system.

Therefore, how to provide a technology capable of reducing the number of memories has become a prominent task for the industries.

SUMMARY OF THE INVENTION

The invention is directed to a processing system capable of reducing the number of storage units and an operating method thereof.

According to one embodiment of the present invention, a processing system capable of connecting to a computer device comprising a second processing unit is provided. The processing system comprises a first processing unit and a first storage unit. The first storage unit is coupled to the first processing unit for storing at least a first programming code and a second programming code. At a first time point, the first processing unit accesses the first programming code from the first storage unit to set the processing system. At a second time point after the first time point, the first processing unit receives an instruction from the second processing unit and transfers the second programming code to the second processing unit in response to the instruction. The second processing unit controls the processing system with the second programming code.

According to another embodiment of the present invention, an operating method of a processing system capable of connecting to a computer device is provided. The computer device has a second processing unit. The processing system comprises a first processing unit and a first storage unit. The first storage unit at least stores the first programming code and the second programming code. The operating method comprises following steps: firstly, at a first time point, the first processing unit accesses a first programming code to set the processing system. Then, at a second time point after the first time point, the first processing unit receives an instruction from the second processing unit. Afterwards, the first processing unit transfers the second programming code to the second processing unit in response to the instruction. The second processing unit controls the processing system with the second programming code.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments are disclosed below for elaborating the invention. However, the embodiments of the invention are for detailed descriptions only, not for limiting the scope of protection of the invention. Furthermore, secondary or unimportant elements are omitted in the accompanying diagrams of the embodiments for highlighting the technical features of the invention.

Figure 1:
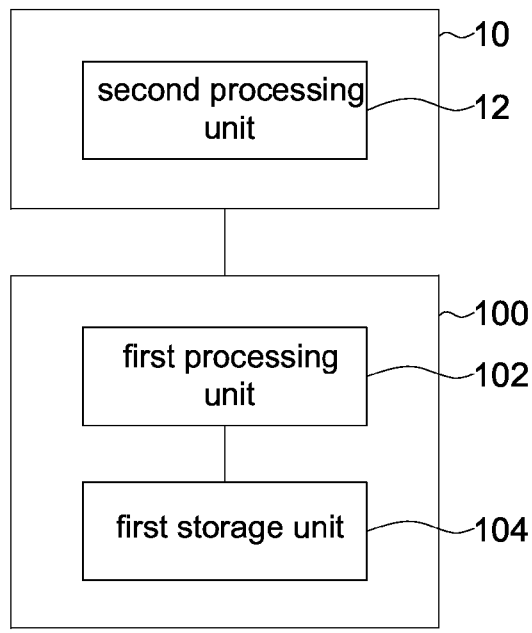
FIG. 1 is a block diagram of a processing system according to an embodiment of the invention.
Figure 2:
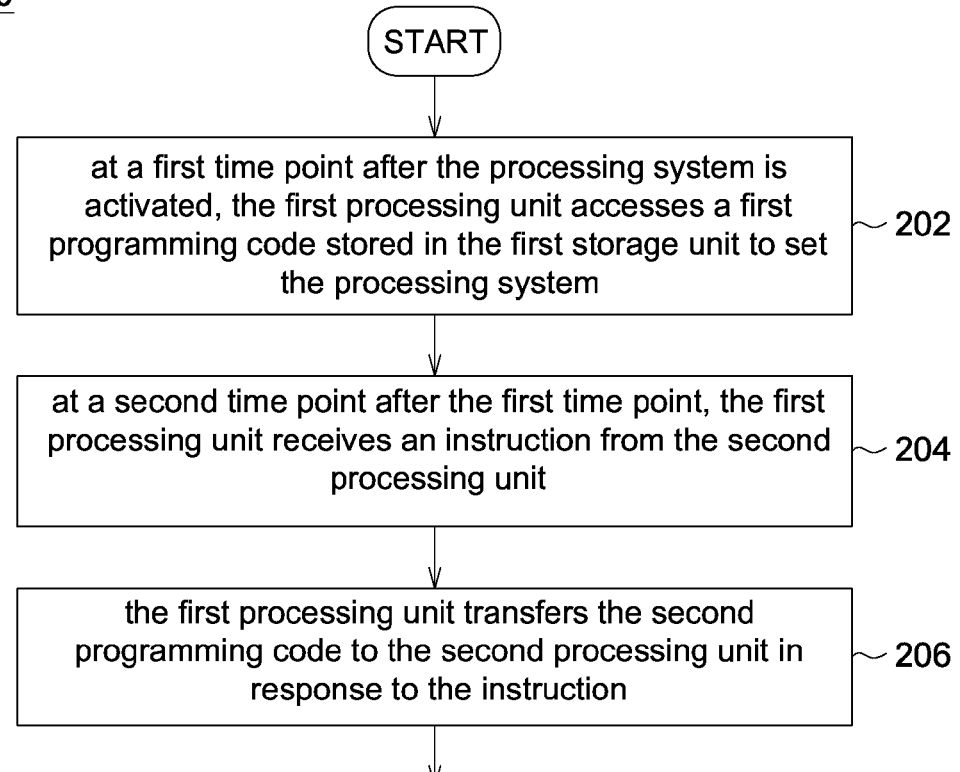
FIG. 2 is a flowchart of an operating method of a processing system.

Refer to FIG. 1 and FIG. 2 at the same time. FIG. 1 is a block diagram of a processing system 100 according to an embodiment of the invention. FIG. 2 is a flowchart of an operating method 200 of a processing system 100. As indicated in FIG. 1, the processing system 100 comprises a first processing unit 102 and a first storage unit 104. The first processing unit 102 can be realized by such as a microprocessor or other processing circuits with computational ability. The first storage unit 104 is coupled to the first processing unit 102 for storing at least a first programming code and a second programming code. The first storage unit 104 can be realized by such as a non-volatile memory. In the present embodiment, the processing system 100 is a processing system disposed inside an electronic device, and can be connected to a computer device 10 such as a personal computer or other computer system. The processing system 100 for example can be connected to the computer device 10 through a cable. The computer device 10 has a second processing unit 12 such as an x86 instruction set configuration processor or other processor with computational ability disposed in the computer device 10.

In the present embodiment, an operating method 200 of the processing system 100 comprises following steps:

Firstly, the method begins at step 202, at a first time point after the processing system 100 is activated, the first processing unit 102 accesses a first programming code stored in the first storage unit 104 to set the processing system 100. For example, after the processing system 100 is activated, the first processing unit 102 immediately obtains power and starts to operate. Meanwhile, the first processing unit 102 accesses the first programming code stored in the first storage unit 104 to initialize the processing system 100.

Then, the method proceeds to step 204, at a second time point after the first time point, the first processing unit 102 receives an instruction from the second processing unit 12. The instruction is such as a control instruction transmitted to the processing system 100 for calling an associated programming code controlling the processing system 100, wherein the control instruction is transmitted by the computer device 10 when executing a particular procedure after the computer device 10 is booted. For example, when the computer device 10 is booted, the second processing unit 12 firstly executes a basic input/output system (BIOS) to initialize a dynamic random access memory (DRAM) of the computer device 10 and relevant peripheral devices, and then executes the particular procedure for calling the processing system 100.

Afterwards, the method proceeds to step 206, the first processing unit 102 transfers the second programming code to the second processing unit 12 in response to the instruction. The second programming code is for the second processing unit 12 to control the processing system 100. For example, the first processing unit 102 accesses a second programming code from the first storage unit 104 and transfers the second programming code to the second processing unit 12 in response to the instruction transmitted from the second processing unit 12. The second programming code is for the processor of a computer device (for example, the second processing unit 12) to initialize the processing system 100 connected thereto and execute relevant control operations.

According to the above disclosure, the processing system 100 firstly sets the processing system 100 through the first processing unit 102 by using the calling time difference of the second processing unit 12 of the computer device 10. After the second processing unit 12 transmitted a calling instruction, the processing system 100 then transfers a relevant programming code of the processing system 100 (the second programming code) to the second processing unit 12, wherein the relevant programming code of the processing system 100 is stored in the first storage unit 104. Since the second processing unit 12 can obtain the needed programming code from the first storage unit 104 through the first processing unit 102, the processing system 100 can omit the independent memory exclusively used by the second processing unit 12 for storing the programming code and store the programming code corresponding to the second processing unit 12 in the first storage unit 104 as well. By doing so, the number of memories used in the processing system 100 can be reduced.

In the present embodiment, the first storage unit 104 can be realized by a storage unit exclusively used for storing the programming code, and is not limited to a particular type. In another embodiment, the processing system 100 is a processing system of a storage device, and the first storage unit 104 can be realized by a main storage unit of a storage device for storing data. In other words, both programming codes and user data are stored in the first storage unit. Suppose the storage device is a solid state disc. The first storage unit can be realized by a non-volatile memory (for example, an NAND flash memory) for storing both programming codes and user data.

Figure 3:
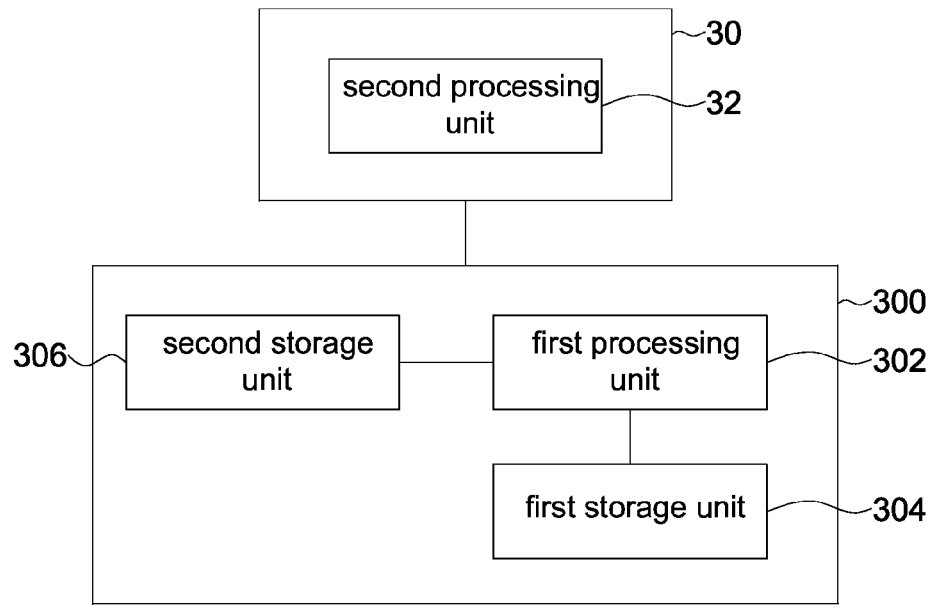
FIG. 3 is a block diagram of a processing system according to another embodiment of the invention.

Referring to FIG. 3, a block diagram of a processing system 300 according to another embodiment of the invention is shown. The processing system 300 comprises a first processing unit 302, a first storage unit 304 and a second storage unit 306. The processing system 300 can be connected to the computer device 30 comprising a second processing unit 32. The present embodiment is different from the previous embodiment mainly in that the processing system 300 further comprises a second storage unit 306. As indicated in FIG. 3, the second storage unit 306 is coupled to the first processing unit 302. The second storage unit 306 can be realized by a memory with an access speed higher than that of the first storage unit 304. For example, the second storage unit 306 can be realized by a cache memory.

In the present embodiment, the first storage unit 304 pre-stores a second programming code. Before receiving an instruction from the second processing unit 32 (that is, before the second time point), the first processing unit 302 firstly copies the second programming code stored in the first storage unit 304 to the second storage unit 306. Afterwards, when the first processing unit 304 receives an instruction from the second processing unit 32, the first processing unit 302 accesses the second programming code from the second storage unit 306 and provides the second programming code to the second processing unit 32 in response to the instruction. Since the access speed of the second storage unit 306 is higher than that of the first storage unit 304, the time required by the first processing unit 302 for transferring the second programming code to the second processing unit 32 can be reduced.

Similarly, in the present embodiment, the first storage unit 304 can be realized by a storage unit exclusively used for storing the programming code, and is not limited to a particular type. In another embodiment, the processing system 300 is a processing system of a storage device, and the first storage unit 304 can be realized by a main storage unit of a storage device for storing data. In other words, both the programming code and the user data are stored in the first storage unit 304.

Figure 4:
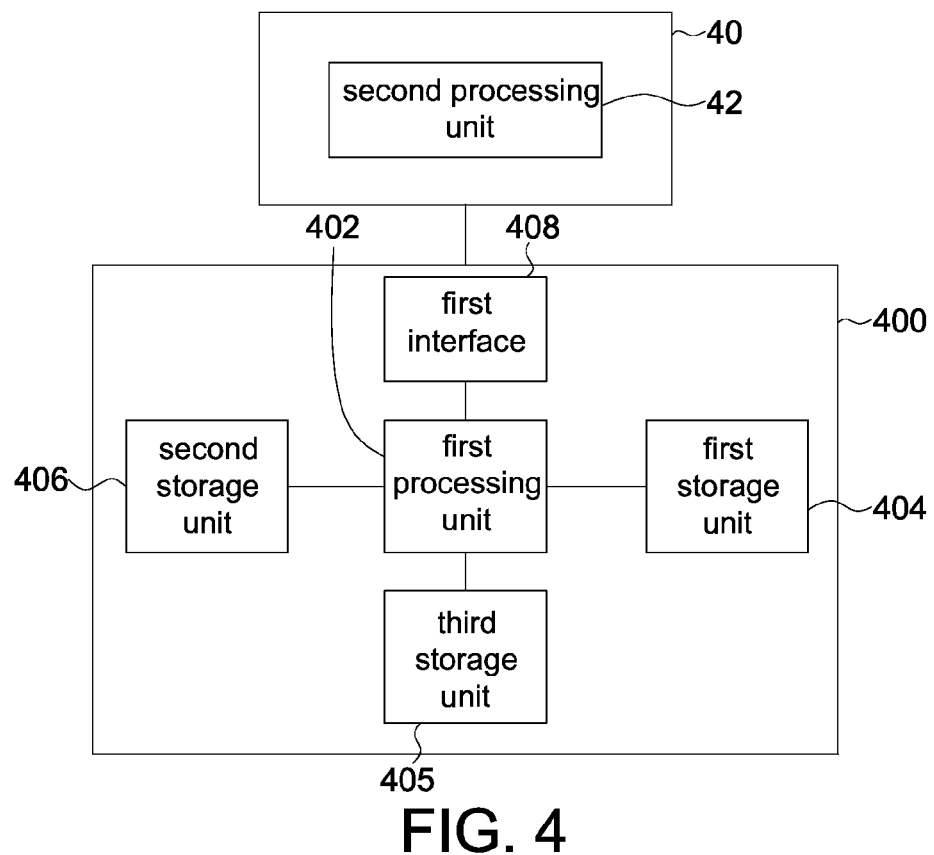
FIG. 4 is a block diagram of a processing system according to another embodiment of the invention.

Refer to FIG. 4, a block diagram of a processing system 400 according to another embodiment of the invention is shown. As indicated in FIG. 4, the processing system 400 comprises a first processing unit 402, a first storage unit 404, a third storage unit 405 and a first interface 408, and selectively comprises a second storage unit 406. The processing system 400 can be connected to a computer device 40 comprising a second processing unit 42. The present embodiment is different from the previous embodiment mainly in that the processing system 400 further comprises a first interface 408 and a third storage unit 405. The first interface 408 can be realized by such as a PCIE/PCI interface or an interface of other specification, and is used as a data transmission interface between the processing system 400 and the computer device 40. The first storage unit 404 is coupled to the first processing unit 402 for storing a programming code. The first storage unit 404 can be realized by such as an option read only memory or a non-volatile memory predetermined used for storing the programming code. The third storage unit 405 is controlled by the first processing unit 402. The third storage unit 405, which can be realized by such as an NAND flash memory or a non-volatile memory capable of storing data, is used as a main data storage region of a solid state disc (SSD).

In the present embodiment, at a first time point after the processing system 400 is activated, the first processing unit 402 accesses a first programming code from the first storage unit 404 to set the third storage unit 405. Afterwards, at a second time point after the first time point, the first processing unit 402 receives an instruction from the second processing unit 42 through the first interface 408 and transfers the second programming code to the second processing unit 42 in response to the instruction.

In an example, the first storage unit 404 pre-stores a first programming code and a second programming code. At a first time point after the processing system 400 is activated, the first processing unit 402 accesses the first programming code from the first storage unit 404 to initialize and control the third storage unit 405. Afterwards, at a second time point after the first time point, the first processing unit 402 receives an instruction from the second processing unit 42 through the first interface 408 and further accesses the second programming code from the first storage unit 404 in response to the instruction.

In another example, the first programming code is pre-stored in the first storage unit 404 and the second programming code is pre-stored in the third storage unit 405, or the second programming code is copied to the third storage unit 405 from the first storage unit 404 before the second time point. Afterwards, when the first processing unit 402 receives an instruction from the second processing unit 42 through the first interface 408, the first processing unit 402 accesses the second programming code from the third storage unit 405.

In another example, suppose the processing system 400 has a second storage unit 406. Before the second time point, the first processing unit 402 copied the second programming code pre-stored in the first storage unit 404 or the third storage unit 405 to the second storage unit 406, so that the first processing unit 402 performs access according to the instruction of the second processing unit 42.

Figure 5:
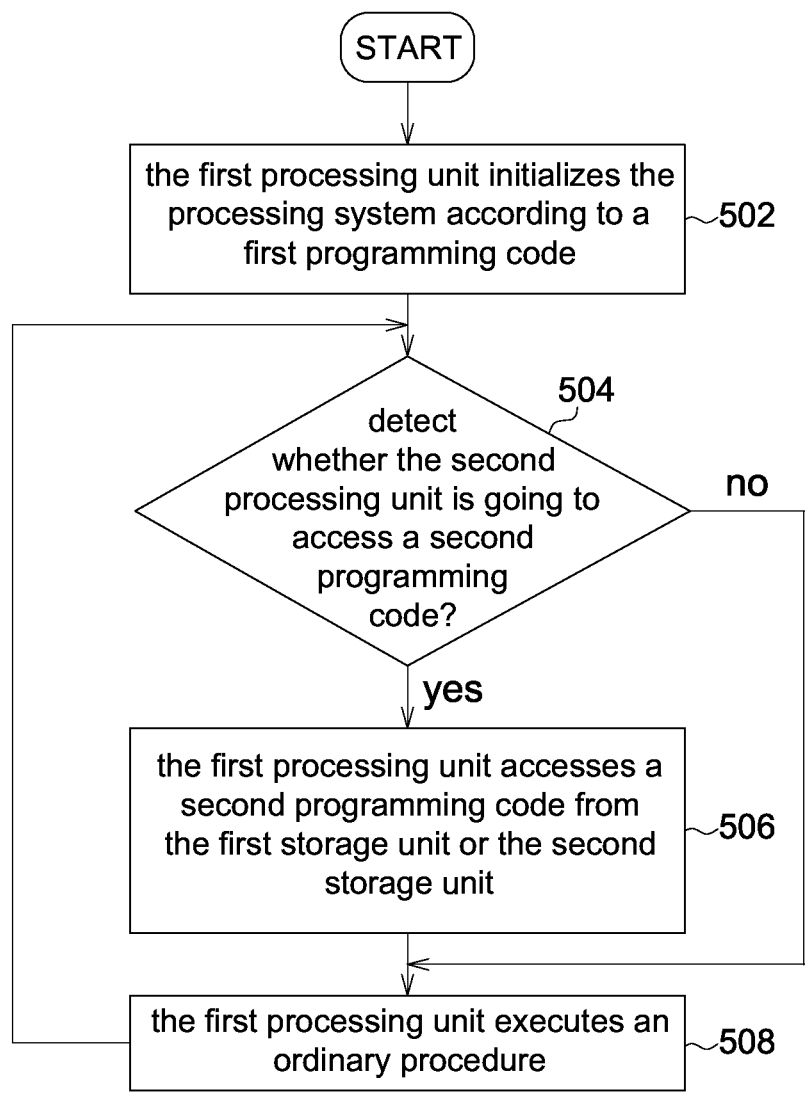
FIG. 5 is an operation flowchart of a processing system.

Referring to FIG. 5, an operation flowchart of a processing system 400 is shown. After the processing system 400 is activated or the computer device 40 is booted, the method begins at step 502, the first processing unit 402 initializes the processing system 400 according to a first programming code. Next, the method proceeds to step 504, the first processing unit 402 detects whether the second processing unit 42 is going to access a second programming code (for example, by judging whether an instruction is received from the second processing unit 42 through the first interface 408). If so, the method proceeds to step 506, the first processing unit 402 accesses a second programming code from the first storage unit 404 or the second storage unit 406. If no, the method proceeds to step 508, the first processing unit 402 executes an ordinary procedure (such as a procedure for controlling data storage). When the first processing unit 402 executes the ordinary procedure, the first processing unit 402 can continuously detect whether the second processing unit 42 is going to access the second programming code (if so, the method returns to step 504).

Although the configuration of above embodiments is exemplified by two processing units (a first processing unit and a second processing unit), the invention is not limited thereto.

Figure 6A:
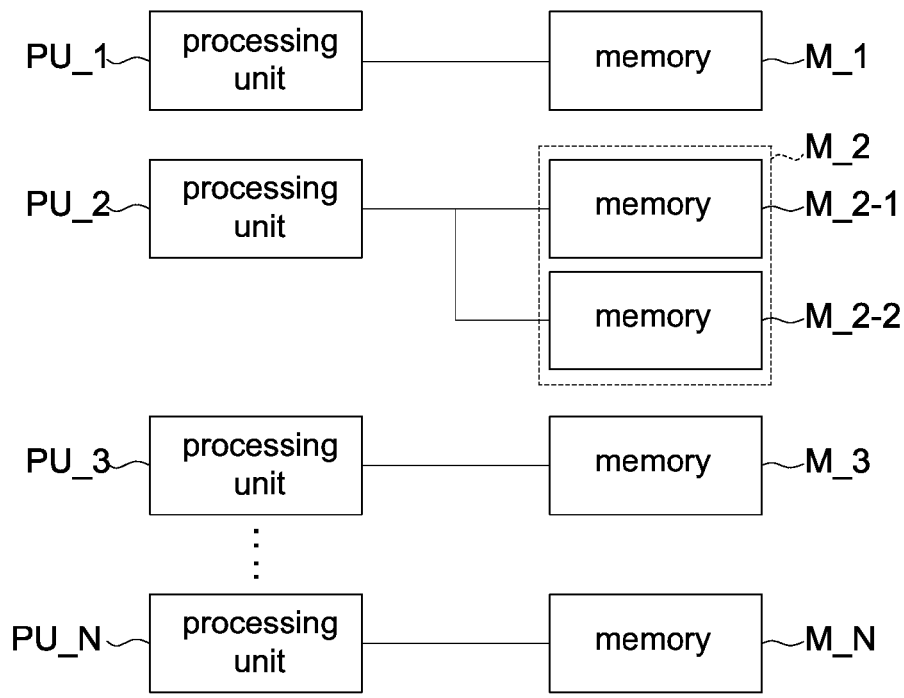
FIG. 6A is a schematic diagram of an entire system with multiple processing units collocating with unreduced number of memories.
Figure 6B:
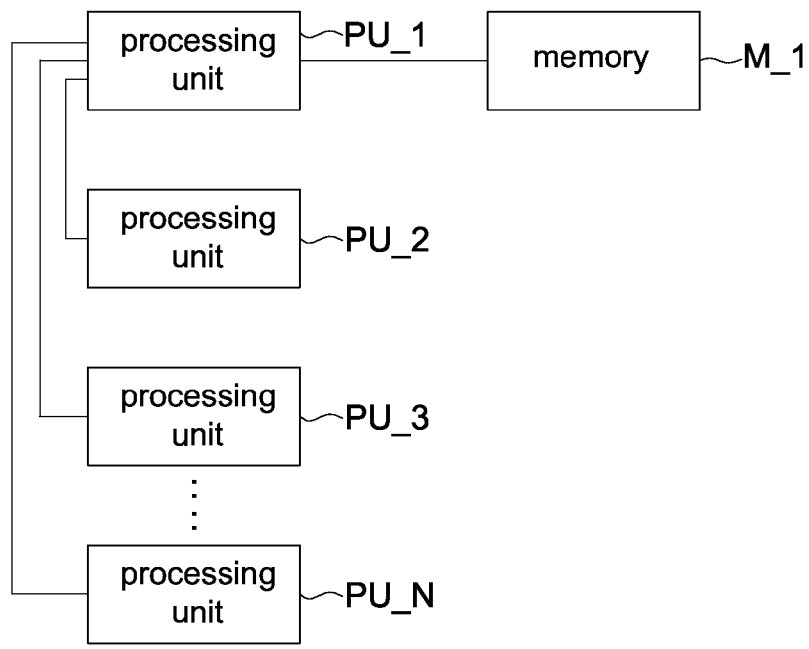
FIG. 6B is a schematic diagram of an entire system with multiple processing units collocating with reduced number of memories.

Refer to FIG. 6A and FIG. 6B at the same time. FIG. 6A is a schematic diagram of an entire system with multiple processing units collocating with unreduced number of memories. FIG. 6B is a schematic diagram of an entire system with multiple processing units collocating with reduced number of memories. As indicated in FIG. 6A, the system has N processing units $PU\_1 \sim PU\_N$ and N memories $M\_1 \sim M\_N$, wherein N is a positive integer larger than 1. The processing units $PU\_1 \sim PU\_N$ correspond to the memories $M\_1 \sim M\_N$ respectively. For example, memory $M\_1$ stores a programming code corresponding to processing unit $PU\_1$, memory $M\_2$, comprising memories $M\_2\text{-}1$ and $M\_2\text{-}2$, stores a programming code corresponding to processing unit $PU\_2$, wherein the memory $M\_2$ comprises memories $M\_2\text{-}1$ and $M\_2\text{-}2$. Other correspondence relationships can be obtained by the same analogy. It should be noted that no matter how many memories each processing unit corresponds to, corresponding memories of a processing unit will only store the programming code corresponding to the processing unit. In terms of the entire system, the programming codes stored in the memories $M\_1 \sim M\_N$ will not be executed at the same time point. That is, the procedure of calling the processing system connected to each processing unit will not be executed by the processing unit at the same time. Therefore, by using the characteristics of time difference, the programming codes corresponding to some of the processing units can be stored in one memory so that the number of memories can be effectively reduced.

Refer to FIG. 6B. Suppose each processing unit is executed at different time point. Under such circumstance, the programming codes of other memories (for example, memories $M\_2 \sim M\_N$) are all stored in the memory $M\_1$. Afterwards, the processing units $PU\_2 \sim PU\_N$ can obtain their needed programming codes from the memory $M\_1$ through the processing unit $PU\_1$. By doing so, the memories $M\_2 \sim M\_N$ are omitted, and the design of the processing system is simplified.

According to the above disclosure, by using the calling time difference between multiple processing units, the processing system of the embodiments of the invention stores corresponding programming codes of multiple processing units in one single storage unit without affecting the operation of each processing unit, hence reducing the number of storage units. On the other hand, the processing system of the embodiments of the invention can selectively copy the programming code to the storage unit having faster access speed in advance to increase the efficiency of the entire system.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A processing system of an electronic device, wherein the electronic device is connected to a computer device and the computer device comprises a second processing unit, the processing system of the electronic device comprising:
 a first processing unit;
 a first storage unit coupled to the first processing unit for storing at least a first programming code and a second programming code; and
 a second storage unit coupled to the first processing unit, wherein an access speed of the second storage unit is higher than an access speed of the first storage unit;
 wherein, the first programming code is for the first processing unit to set the processing system of the electronic device, and the second programming code is for the second processing unit of the computer device to control the processing system of the electronic device,
 wherein, at a first time point, the first processing unit accesses the first programming code from the first storage unit to set the processing system, and at a second time point after the first time point, the first processing unit receives an instruction from the second processing unit of the computer device and transfers the second programming code to the second processing unit of the computer device in response to the instruction, wherein, the second processing unit of the computer device controls the processing system with the second programming code, and wherein, before the second time point, the first processing unit copies the second programming code stored in the first storage unit to the second storage unit, and when the first processing unit receives the instruction from the second processing unit, the first processing unit accesses the second programming code from the second storage unit in response to the instruction and provides the second programming code to the second processing unit of the computer device.

2. The processing system according to claim 1, wherein the first processing unit accesses the second programming code from the first storage unit in response to the instruction sent from the second processing unit and transfers the second programming code to the second processing unit of the computer device.

3. The processing system according to claim 1, wherein the first storage unit is an option read only memory or an NAND flash memory.

4. The processing system according to claim 1, wherein the second storage unit is a cache memory.

5. The processing system according to claim 1, wherein the processing system is used in a storage device, and the first storage unit is for storing the first programming code, the second programming code and user data.

6. An operating method of a processing system of an electronic device, wherein the electronic device connects to a computer device, wherein the computer device comprises a second processing unit, and the processing system comprises a first processing unit, a first storage unit, and a second storage unit coupled to the first processing unit, wherein the first storage unit at least stores a first programming code and a second programming code, and wherein the second storage unit has an access speed higher than an access speed of the first storage unit, the operating method comprising:

accessing the first programming code stored in the first storage unit by the first processing unit to set the processing system at a first time point;

receiving an instruction from the second processing unit of the computer device by the first processing unit at a second time point after the first time point; and in response to the instruction, transferring the second programming code to the second processing unit of the computer device by the first processing unit, wherein the first programming code is for the first processing unit to set the processing system of the electronic device, and the second programming code is fs or the second processing unit of the computer device to control the processing system of the electronic device, and the second processing unit of the computer device controls the processing system of the electronic device with the second programming code;

copying the second programming code stored in the first storage unit to the second storage unit by the first processing unit before the second time point;

accessing the second programming code from the second storage unit by the first processing unit in response to the instruction when the first processing unit receives the instruction sent from the second processing unit of the computer device; and providing the second programming code accessed from the second storage unit to the second processing unit of the computer device.

7. The operating method according to claim 6, further comprising:

accessing the second programming code from the first storage unit by the first processing unit in response to the instruction sent from the second processing unit of the computer device; and transferring the second programming code accessed from the first storage unit to the second processing unit of the computer device.

8. The operating method according to claim 6, wherein the second storage unit is a cache memory.

* * * * *